(12) United States Patent
Obaidi

(10) Patent No.: US 11,843,950 B2
(45) Date of Patent: Dec. 12, 2023

(54) PROTECTING A TELECOMMUNICATIONS NETWORK USING NETWORK COMPONENTS AS BLOCKCHAIN NODES

(71) Applicant: T-Mobile USA, Inc., Bellevue, WA (US)

(72) Inventor: Ahmad Arash Obaidi, San Ramon, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 71 days.

(21) Appl. No.: 17/482,308

(22) Filed: Sep. 22, 2021

(65) Prior Publication Data

US 2022/0014922 A1 Jan. 13, 2022

Related U.S. Application Data

(63) Continuation of application No. 16/237,607, filed on Dec. 31, 2018, now Pat. No. 11,159,945.

(51) Int. Cl.
| | |
|---|---|
| *H04W 24/08* | (2009.01) |
| *H04W 12/122* | (2021.01) |
| *H04W 12/06* | (2021.01) |
| *H04L 9/40* | (2022.01) |
| *G06F 16/182* | (2019.01) |

(52) U.S. Cl.
CPC ...... *H04W 12/122* (2021.01); *G06F 16/1824* (2019.01); *H04L 63/1466* (2013.01); *H04W 12/06* (2013.01); *H04W 24/08* (2013.01)

(58) Field of Classification Search
CPC ... H04W 24/08; H04W 12/06; H04W 12/122; H04L 63/1466; G06F 16/1824

USPC .......................................................... 726/23
See application file for complete search history.

(56) References Cited

U.S. PATENT DOCUMENTS

| | | | |
|---|---|---|---|
| 8,918,645 | B2 | 12/2014 | Evans et al. |
| 9,516,053 | B1 | 12/2016 | Muddu et al. |
| 9,985,984 | B1 | 5/2018 | Chavez et al. |
| 10,310,505 | B1 | 6/2019 | Hanson et al. |
| 10,805,068 | B1 | 10/2020 | Leise et al. |
| 11,039,317 | B2 | 6/2021 | Obaidi |

(Continued)

FOREIGN PATENT DOCUMENTS

| | | |
|---|---|---|
| CN | 104854893 A | 8/2015 |
| CN | 107508859 A | 12/2017 |

(Continued)

OTHER PUBLICATIONS

International Searching Authority, International Search Report and Written Opinion, PCT Patent Application PCT/US2019/068429, dated May 1, 2020, 11 pages.

(Continued)

*Primary Examiner* — Josnel Jeudy
(74) *Attorney, Agent, or Firm* — Perkins Coie LLP

(57) ABSTRACT

Systems and methods are described herein for providing a telecommunications network, such as a wireless network, LTE (Long Term Evolution) network, and so on, with blockchain nodes, agents, or sub-nodes. The blockchain nodes enable network components to access and maintain a blockchain for the network, such as a distributed ledger that tracks actions, activities, or other transaction associated with the telecommunications network.

20 Claims, 7 Drawing Sheets

(56) References Cited

U.S. PATENT DOCUMENTS

| | | | |
|---|---|---|---|
| 11,088,854 B2* | 8/2021 | El Abed | G06Q 20/065 |
| 11,159,945 B2 | 10/2021 | Obaidi | |
| 11,329,982 B2 | 5/2022 | Obaidi | |
| 2006/0230289 A1 | 10/2006 | Fox et al. | |
| 2007/0291945 A1 | 12/2007 | Chuang et al. | |
| 2014/0220966 A1 | 8/2014 | Muetzel et al. | |
| 2015/0135283 A1 | 5/2015 | Tofighbakhsh | |
| 2016/0283920 A1 | 9/2016 | Fisher et al. | |
| 2016/0330748 A1* | 11/2016 | Bindrim | H04L 63/20 |
| 2017/0243212 A1 | 8/2017 | Castinado et al. | |
| 2017/0353496 A1 | 12/2017 | Pai et al. | |
| 2017/0364698 A1 | 12/2017 | Goldfarb et al. | |
| 2018/0091596 A1 | 3/2018 | Alvarez et al. | |
| 2018/0122237 A1 | 5/2018 | Nascimento et al. | |
| 2018/0219893 A1 | 8/2018 | Li et al. | |
| 2018/0225693 A1 | 8/2018 | Postrel | |
| 2018/0248896 A1 | 8/2018 | Challita et al. | |
| 2018/0287780 A1 | 10/2018 | Safford et al. | |
| 2018/0293557 A1 | 10/2018 | Kim et al. | |
| 2018/0337769 A1 | 11/2018 | Gleichauf | |
| 2018/0342036 A1 | 11/2018 | Zachary | |
| 2018/0365397 A1 | 12/2018 | Viscarola et al. | |
| 2018/0372502 A1 | 12/2018 | Rønnow et al. | |
| 2018/0376305 A1 | 12/2018 | Ramalho De Oliveira et al. | |
| 2019/0058697 A1 | 2/2019 | Chang et al. | |
| 2019/0093215 A1 | 3/2019 | Kang et al. | |
| 2019/0104196 A1 | 4/2019 | Li et al. | |
| 2019/0182284 A1 | 6/2019 | Signorini et al. | |
| 2019/0199756 A1 | 6/2019 | Correnti et al. | |
| 2019/0215159 A1 | 7/2019 | Notani | |
| 2019/0245697 A1 | 8/2019 | El Abed et al. | |
| 2019/0259274 A1 | 8/2019 | Avery et al. | |
| 2019/0268284 A1 | 8/2019 | Karame et al. | |
| 2019/0268466 A1 | 8/2019 | Inoue | |
| 2019/0303942 A1 | 10/2019 | Balaraman et al. | |
| 2019/0340269 A1 | 11/2019 | Biernat et al. | |
| 2019/0361917 A1 | 11/2019 | Tran et al. | |
| 2019/0373472 A1 | 12/2019 | Smith et al. | |
| 2019/0380037 A1 | 12/2019 | Lifshitz et al. | |
| 2019/0386969 A1 | 12/2019 | Verzun et al. | |
| 2019/0392536 A1 | 12/2019 | Rice | |
| 2020/0004854 A1 | 1/2020 | Inturi et al. | |
| 2020/0014720 A1 | 1/2020 | Giura | |
| 2020/0020038 A1 | 1/2020 | Haile et al. | |
| 2020/0042012 A1 | 2/2020 | Zander | |
| 2020/0045119 A1 | 2/2020 | Weldemariam et al. | |
| 2020/0099531 A1 | 3/2020 | Chidambaram et al. | |
| 2020/0099698 A1 | 3/2020 | Kundu et al. | |
| 2020/0112432 A1 | 4/2020 | Iwama et al. | |
| 2020/0117690 A1 | 4/2020 | Tran et al. | |
| 2020/0118131 A1 | 4/2020 | Diriye et al. | |
| 2020/0145234 A1 | 5/2020 | Nishijima | |
| 2020/0160330 A1 | 5/2020 | Yan | |
| 2020/0186527 A1 | 6/2020 | Delson et al. | |
| 2020/0186607 A1* | 6/2020 | Murphy | G06Q 40/12 |
| 2020/0195495 A1* | 6/2020 | Parker | H04L 41/082 |
| 2020/0200824 A1* | 6/2020 | Narayanaswami | H04L 67/12 |
| 2020/0213305 A1 | 7/2020 | Obaidi et al. | |
| 2020/0213826 A1 | 7/2020 | Obaidi | |
| 2020/0213852 A1 | 7/2020 | Obaidi | |
| 2020/0213857 A1 | 7/2020 | Obaidi | |
| 2020/0322130 A1* | 10/2020 | Rajagopal | G06F 16/2379 |
| 2020/0380156 A1* | 12/2020 | Garg | H04L 9/3239 |
| 2020/0389294 A1 | 12/2020 | Soundararajan et al. | |
| 2021/0037013 A1 | 2/2021 | Salkintzis | |
| 2021/0049477 A1 | 2/2021 | Sakae et al. | |
| 2021/0274350 A1 | 9/2021 | Obaidi | |

FOREIGN PATENT DOCUMENTS

| | | | | |
|---|---|---|---|---|
| CN | 108234456 | A | 6/2018 | |
| CN | 108681965 | A | 10/2018 | |
| CN | 108833081 | A | 11/2018 | |
| CN | 108881233 | A | 11/2018 | |
| EP | 3285248 | A1 | 2/2018 | |
| WO | 2018014123 | A1 | 1/2018 | |
| WO | 2018033309 | A1 | 2/2018 | |
| WO | 2018126029 | A2 | 7/2018 | |
| WO | WO-2019019853 | A1 * | 1/2019 | H04L 29/06 |

OTHER PUBLICATIONS

International Searching Authority, International Search Report and Written Opinion, PCT Patent Application PCT/US2019/068433, dated Apr. 29, 2020, 9 pages.

European Patent Office, Extended European Search Report, EP Patent Application 19907507.8, dated Aug. 11, 2022, 10 pages.

Jover, Roger Piqueras et al. "dHSS—Distributed Peer-to-Peer Implementation of the LTE HSS Based on the Bitcoin / Namecoin Architecture," 2016 IEEE International Conference on Communications Workshops, May 23, 2016, pp. 354-359.

European Patent Office, Supplementary European Search Report, EP Patent Application 19907420.4, dated Dec. 5, 2022, 11 pages.

* cited by examiner

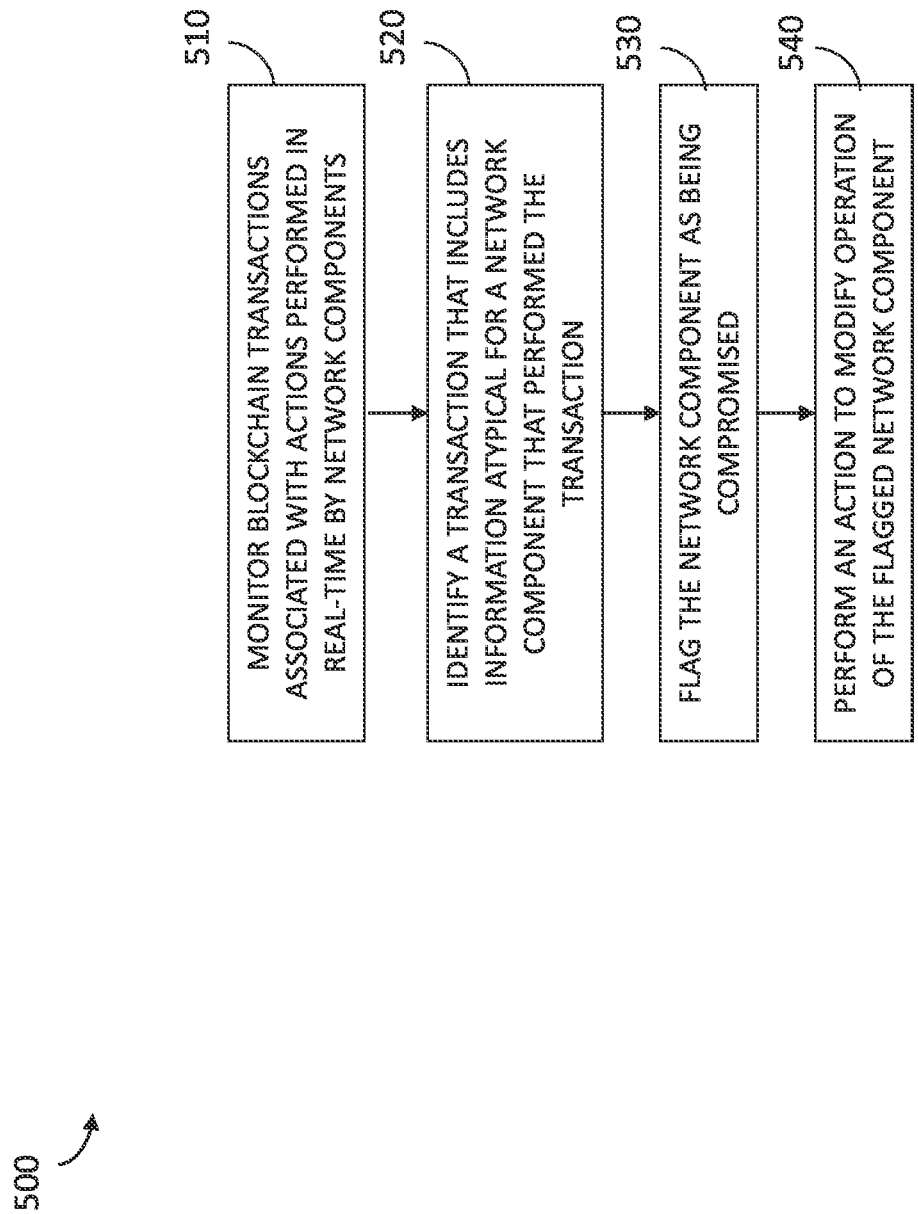

PROTECTING A TELECOMMUNICATIONS NETWORK USING NETWORK COMPONENTS AS BLOCKCHAIN NODES

CROSS REFERENCE TO RELATED APPLICATIONS

This application is a continuation of U.S. patent application Ser. No. 16/237,607, filed on Dec. 31, 2018, entitled PROTECTING A TELECOMMUNICATIONS NETWORK USING NETWORK COMPONENTS AS BLOCKCHAIN NODES, which is related to U.S. patent application Ser. No. 16/237,638, filed on Dec. 31, 2018, entitled MANAGING INTERNET OF THINGS DEVICES USING BLOCKCHAIN OPERATIONS, U.S. patent application Ser. No. 16/237,634, filed on Dec. 31, 2018, entitled USING A BLOCKCHAIN TO DETERMINE TRUSTWORTHINESS OF MESSAGES BETWEEN VEHICLES OVER A TELECOMMUNICATIONS NETWORK, and U.S. patent application Ser. No. 16/237,626, filed on Dec. 31, 2018, entitled USING A BLOCKCHAIN TO DETERMINE TRUSTWORTHINESS OF MESSAGES WITHIN A TELECOMMUNICATIONS NETWORK FOR A SMART CITY, all of which are hereby incorporated by reference in their entirety.

BACKGROUND

Various types of networks, including wireless networks, cellular networks, and other types of telecommunications networks, provide people across the world with communication services. For example, in most locations around the world, a user of a mobile device can access a network and communicate with other users or systems, either via voice calls, text messages, or data over the Internet. These networks, and their entrenched ubiquity, have connected users to many different users as well as to vast troves of information and services. Telecommunications networks, arguably, have made the world better for people.

However, such networks include various physical and virtual vulnerabilities, and a small minority of people will try and take advantage of these vulnerabilities to profit from fraudulent and other deceitful acts. Therefore, network providers will continue to improve the telecommunications networks, their components, and/or devices and systems that utilize the networks, with technology capable of preventing or deterring nefarious actors from attempting to exploit the network weaknesses.

BRIEF DESCRIPTION OF THE DRAWINGS

Embodiments of the present technology will be described and explained through the use of the accompanying drawings.

FIG. 5 is a flow diagram illustrating a method for monitoring, in real-time, a telecommunications network using components of the network.

Figure 1:
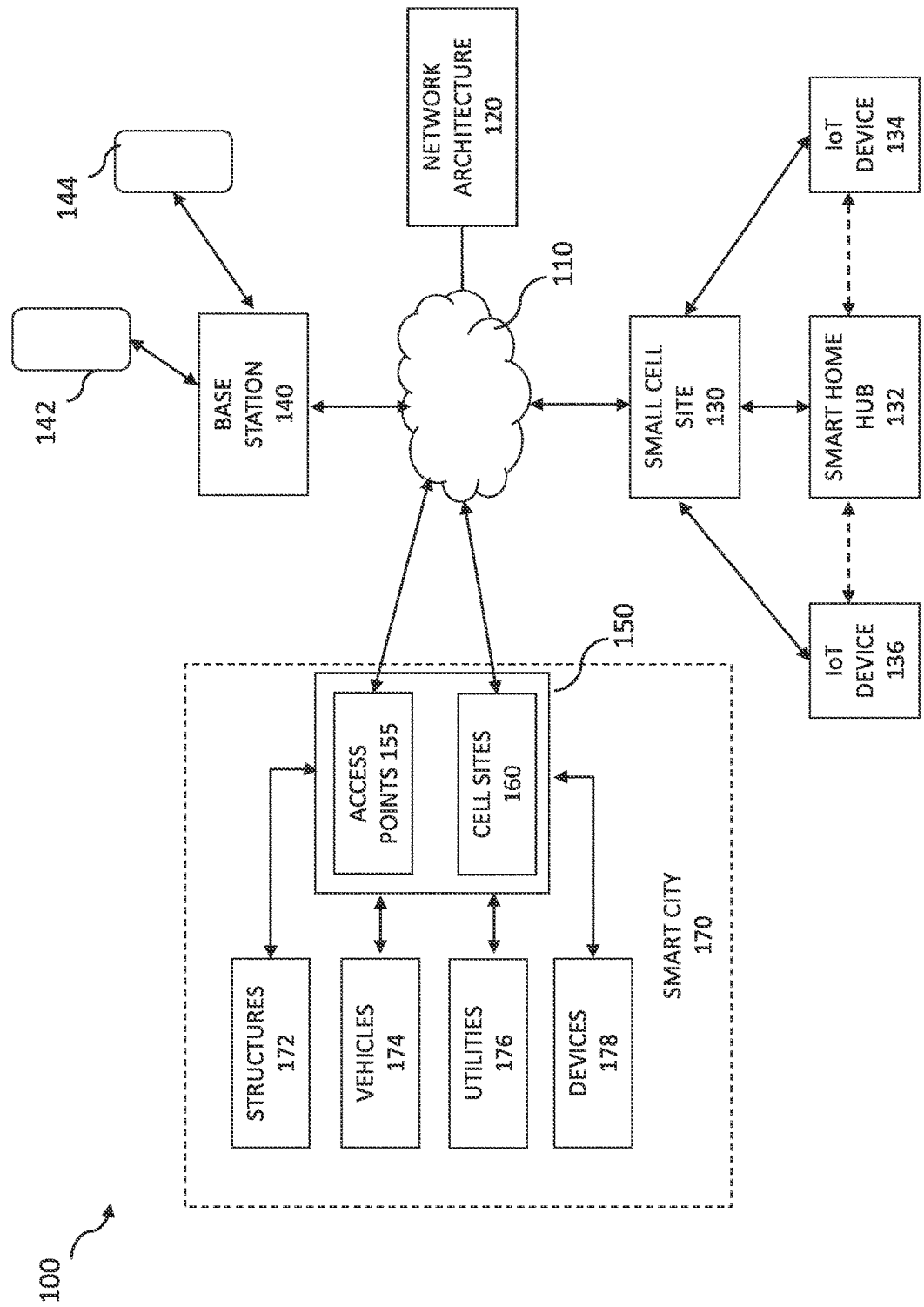
FIG. 1 is a block diagram illustrating a suitable network environment of devices and components representing nodes of a blockchain network.

The drawings have not necessarily been drawn to scale. Similarly, some components or operations can be separated into different blocks or combined into a single block for discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods are described herein for providing blockchain functionality to a telecommunications network, its components, and devices and systems that communicate over the telecommunications network. The systems and methods (collectively, "systems") can implement devices, systems, components, and so on with agents or other modules that transform or establish them as nodes (or sub-nodes) distributed across a network, such as nodes of a blockchain network.

For example, a telecommunications network, such as a wireless network, LTE (Long Term Evolution) network, and so on, can configure some or all of its components with nodes, agents, or sub-nodes, in order to enable the components to access and maintain a blockchain for the network, such as a distributed ledger that tracks actions, activities, or other transaction associated with the telecommunications network.

By utilizing aspects of a blockchain network, the network components (e.g., base stations and cells, gateways, and other network components) can self-regulate or self-manage operations within the network. Thus, the network components can utilize the blockchain to identify and prevent various attacks to the network (e.g., hacking into components, Man-in-the-Middle attacks, rogue base station activities).

For example, the network components, acting as distributed nodes, monitor the network, in real-time, to identify compromised components (e.g., "poison pill" components) and initiate actions to mitigate or prevent the compromised components from affecting the network's operations. Further, the network components can utilize aspects of the blockchain to identify components operating at low or sub-standard performance levels (e.g., low quality of service levels), and initiate actions to remedy their performance within the network.

Thus, in some embodiments, the systems provision a network component as a quarantine component, where a quarantine component is a component of the telecommunications network known to be uncompromised and/or operating as predicted within the telecommunications network. The quarantine component then receives a message from a target network component, such as a network component potentially compromised by a cybersecurity attack to the telecommunications network.

The quarantine component performs, via a self-contained or internal node, a blockchain operation with a blockchain that tracks activities within the telecommunications network, such as a blockchain operation based on the message received from the target network component. The quarantine component then determines whether the target network component has been compromised by the cybersecurity attack to the telecommunications network based on the performed blockchain operation.

Thus, the systems can provision some or all components of the telecommunications network as gatekeepers or monitors of the network, providing the components with nodes that enable the components to perform operations associated with the blockchain and access a full copy of the blockchain.

For example, the systems can monitor the telecommunications network in real-time for compromised network components with some or all of the associated network components. These associated components include: (1) a gateway component containing a blockchain node associated with a blockchain that maintains transactions for the telecommunications network, (2) a cell site containing a blockchain node associated with the blockchain that maintains transactions for the telecommunications network, (3) a charging component containing a blockchain node associated with the blockchain that maintains transactions for the telecommunications network, and so on.

Thus, the systems utilize blockchain processes to monitor activities within a telecommunications network and prevent or mitigate attacks to the network via one or more compromised network components. In doing so, the network can prevent, in real-time, poison pill and other compromised network components from controlling operations or otherwise harming the telecommunications networks and its components, among other benefits.

In the following description, for the purposes of explanation, numerous specific details are set forth in order to provide a thorough understanding of embodiments of the present technology. It will be apparent, however, that embodiments of the present technology can be practiced without some of these specific details.

Examples of Telecommunication Networks as Blockchain Networks of Nodes

As described herein, in some embodiments, the systems manage devices, components, and systems of or associated with a telecommunications network as nodes on a blockchain network. Devices, therefore, functions as nodes (or sub-nodes) that are distributed across the blockchain network.

Nodes on a blockchain network perform various functions for the network. They process transactions and maintain copies (e.g., replicated databases or ledgers) of the blockchain. Thus, the distributed nodes combine to be the blockchain network. For example, with respect to cryptocurrencies (e.g., Bitcoin), the nodes check new currency transactions against a consensus protocol, which is a uniform system of agreement between all the nodes of the network when validating transactions processed by the nodes. Therefore, a node itself, relying on the consensus protocol, determines whether to validate transactions at the node.

There can be different types of nodes, such as full nodes, sub-nodes, and agents. Full nodes maintain a complete copy of every block (e.g., record) and transaction within the blockchain network, and validate the blocks/transactions against the consensus protocol. Sub-nodes and agents, however, can only validate their own transactions. In some cases, a group of sub-nodes or agents can act, together, as a node or full node. Further, nodes, sub-nodes, and agents can act as endpoint nodes (when communications between nodes in the network end or terminate) or as redistribution nodes (where communications are redistributed to other nodes of the network).

Telecommunication networks are well suited to managing communications between components (e.g., devices, cells, access points, registers, databases, gateways, and so on) by representing the components as nodes of blockchain networks. For example, any devices associated with the network, communicating via the network, and/or within or providing the network, can be nodes and function to validate transactions, authenticate other devices, perform actions or operations, or otherwise communicate over the network based on blockchain transactions.

FIG. 1 is a block diagram illustrating a suitable network environment 100 of devices and components representing nodes of a blockchain network. As depicted, a telecommunications network 110 can extend into virtually any area, location, structure, or environment, providing services to devices and systems of all scales—from mobile devices to smart homes and other single structures, to communities, cities, and other groups of structures or devices.

The telecommunications network is provided via a network architecture 120, such as the various components that provide communication services (e.g., voice calls, text and other messaging, data communications, and so on) to mobile devices and other user equipment. As described herein, the network architecture can include access points or networks, gateways, core networks components (e.g., operations components, packet control components, policy control functions, charging components, subscriber databases, and so on), and so on.

Devices, systems, and geographical areas can access the telecommunications network 110 through a variety of different sites, access points, and/or networks. For example, a small cell site (e.g., a femtocell, picocell, or other small cell) 130 can provide access to the network 110 to a small or targeted area, such as a smart home hub 132 and its various connected (internet of things, or IoT) devices 134, 136. The small cell site 130 can provide access to the smart home hub 132 and the devices 134, 136 directly (as well as any mobile devices), or the devices can access the network 110 via the smart home hub 132.

In addition to the small cell site 130, the devices, systems, and/or areas can access the network 110 via base stations or other cell sites, such as base station 140. For example, mobile devices 142, 144 can communicate over the network 110 by accessing the network 110 via the base station 140.

Further, devices, systems, and/or other areas, such as smart cities and their various components and infrastructure can access the network 110 via provisioned access networks 150, such as access networks 150 supported by access points 155 (e.g., wireless access points, hotspots, routers, and so on), or other cell sites 160 (e.g., small cells or base stations positioned to service specific areas or centers).

For example, a smart city 170 can include structures 172 (e.g., houses, buildings, schools, hospitals, and so on) that connect to the network 110 via the access network 150. Vehicles 174 can also access the network 110 vis the access network 150. Further, various utilities 176 and their systems or devices (e.g., electric grid components, water systems, gas or other fuel systems, wireless infrastructure systems, emergency response systems, and so on), can communicate over the network 110. Also, devices 178 (e.g., traffic lights and other devices, street lamps, parking meters, and so on), access the network 110 via the access network 150.

Some or all of these systems and devices 172, 174, 176, 178 can communicate with one another via the network 110. For example, vehicles 174 can communicate with other vehicles 174, or with certain devices 178 (e.g., traffic lights), or with services provided by utilities 176 (e.g., emergency response services), or with structures 172 (e.g., smart home devices) over the network 110. As another example, a utility (e.g., the electric grid) can communicate with other utilities (e.g., the emergency response system), with vehicles 174, and so on.

Thus, in some embodiments, the telecommunications network 110 (managed by the network architecture 120) provides communication services to a wide range of all the different devices and systems capable of communications—from single mobile devices 142, 144 to large-scale connected cities 170 of devices, systems, and structures. Further, although FIG. 1 depicts examples of how these device and systems access the network 110, other configurations are possible. For example, mobile device 142 can access the network 110 via small cell site 130, and IoT device 132 can access the network 110 via the base station 140, among other configurations.

As described herein, some or all of the devices or systems depicted in FIG. 1 or the other Figures can act as or be configured to function as a node or sub-node of a blockchain network. A node or sub-node can be implemented as a module, agent, or another component of a device or system. The agents or modules can be functional modules or engines that are implemented with a combination of software (e.g., executable instructions, or computer code) and hardware (e.g., at least a memory and processor). Accordingly, as used herein, in some examples a module or engine is a processor-implemented module or set of code and represents a computing device having a processor that is at least temporarily configured and/or programmed by executable instructions stored in memory to perform one or more of the particular functions that are described herein.

As nodes (or sub-nodes), the devices or systems function to maintain a distributed ledger (e.g., a blockchain) of transactions. Further, the devices or systems can collaboratively function to validate, verify, certify, or authenticate data and/or transactions communicated between the nodes. Thus, the devices or systems, working as nodes of a blockchain network, operate to provide security, reliability, and/or redundancy between themselves and various portions or segments of the telecommunications network 110.

The blockchain, being associated with the network and various devices or systems, can be configured to track or store information specific to communications over the network. For example, block chain transactions can include information identifying a location of a user or device (e.g., GPS information, cell tower or base station information, access point information, and so on), device or user identifiers, such as Mobile Station International Subscriber Directory Number (MSISDN) or International Mobile Equipment Identity (IMEI) information, biometric information and other biological or physical user identifiers, and so on.

For example, a device can access a network and run an instance of an Ethereum virtual machine, and utilize various device or network specific information when authenticating onto the network via various blockchain transactions. The blockchain, tracking and maintaining such information, can then authenticate the device via the information with a high degree of confidence, knowing that the actual device (or the person behind the device) is valid and authorized to access the network.

To that end, the devices or systems, as nodes, can perform specific functions when communicating with other devices or systems, depending on their role within the network 110 or how they are being utilized. For example, a mobile device (e.g., mobile device 142), can act as an endpoint node of a blockchain network, whereas a gateway component of the network architecture 120 can function as a redistribution node.

Figure 2A:
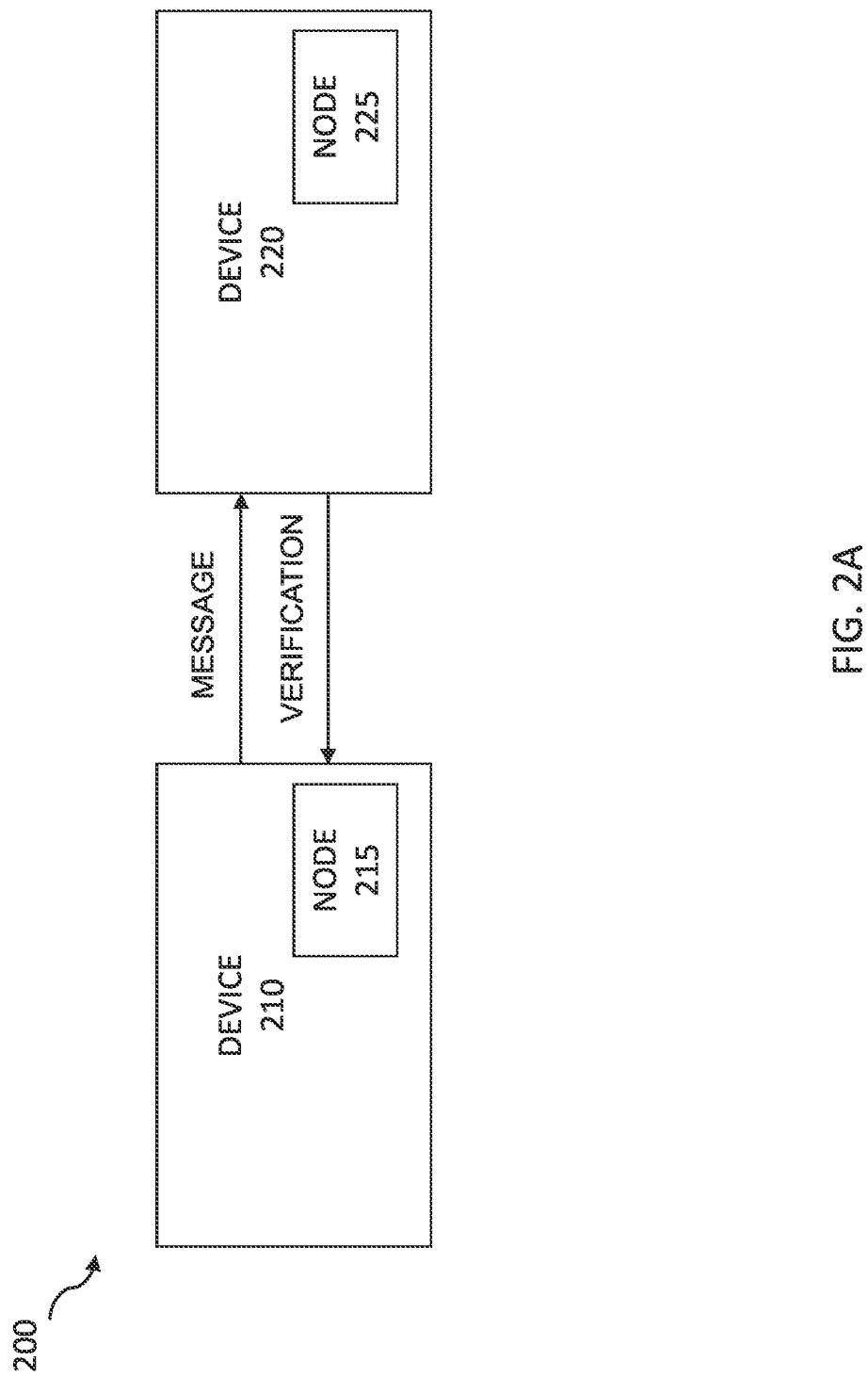
FIG. 2A is a block diagram illustrating communications between two separate devices represented as nodes of a blockchain network.
Figure 2B:
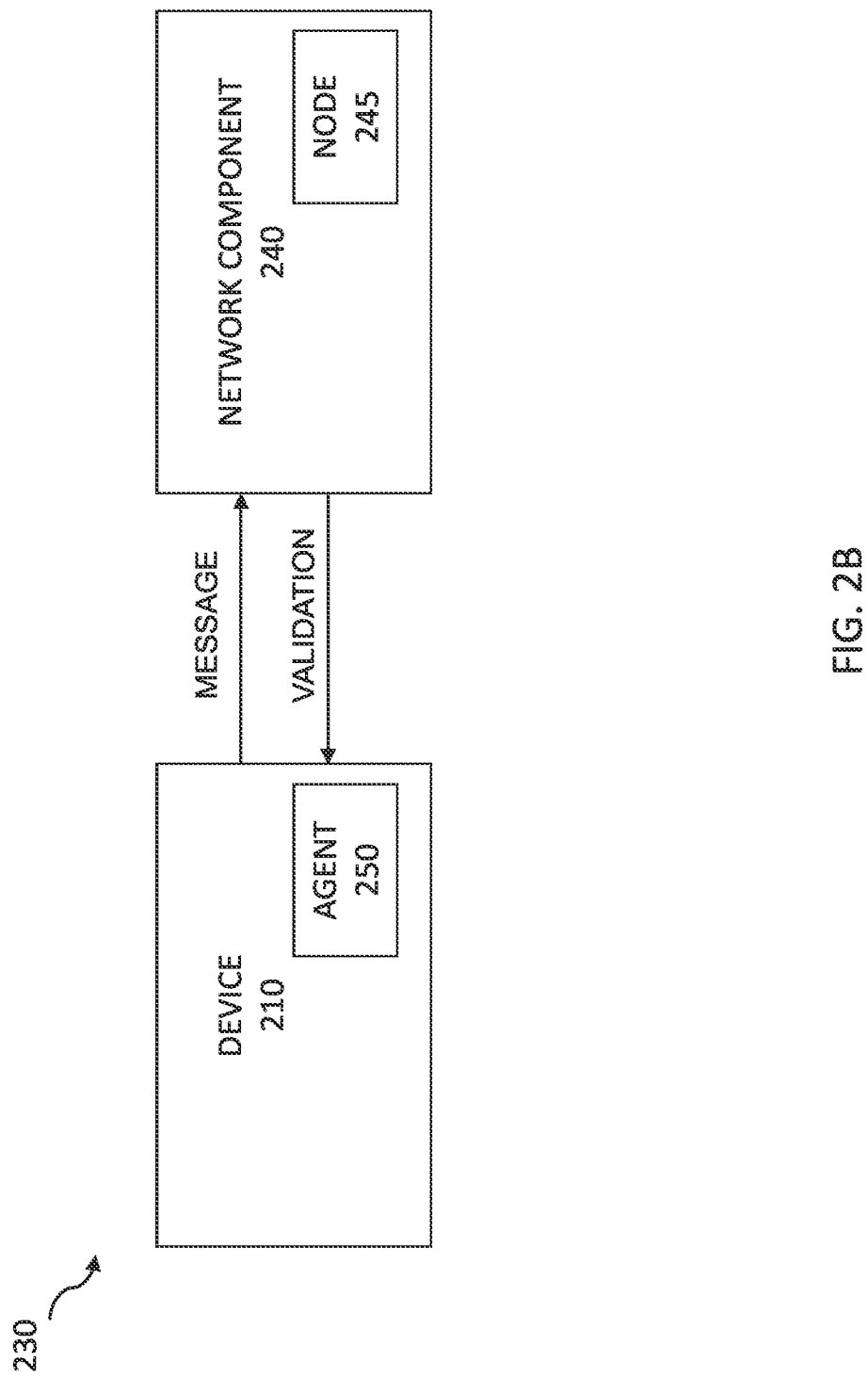
FIG. 2B is a block diagram illustrating communications between a device and a network component, where both are represented as nodes of a blockchain network.
Figure 2C:
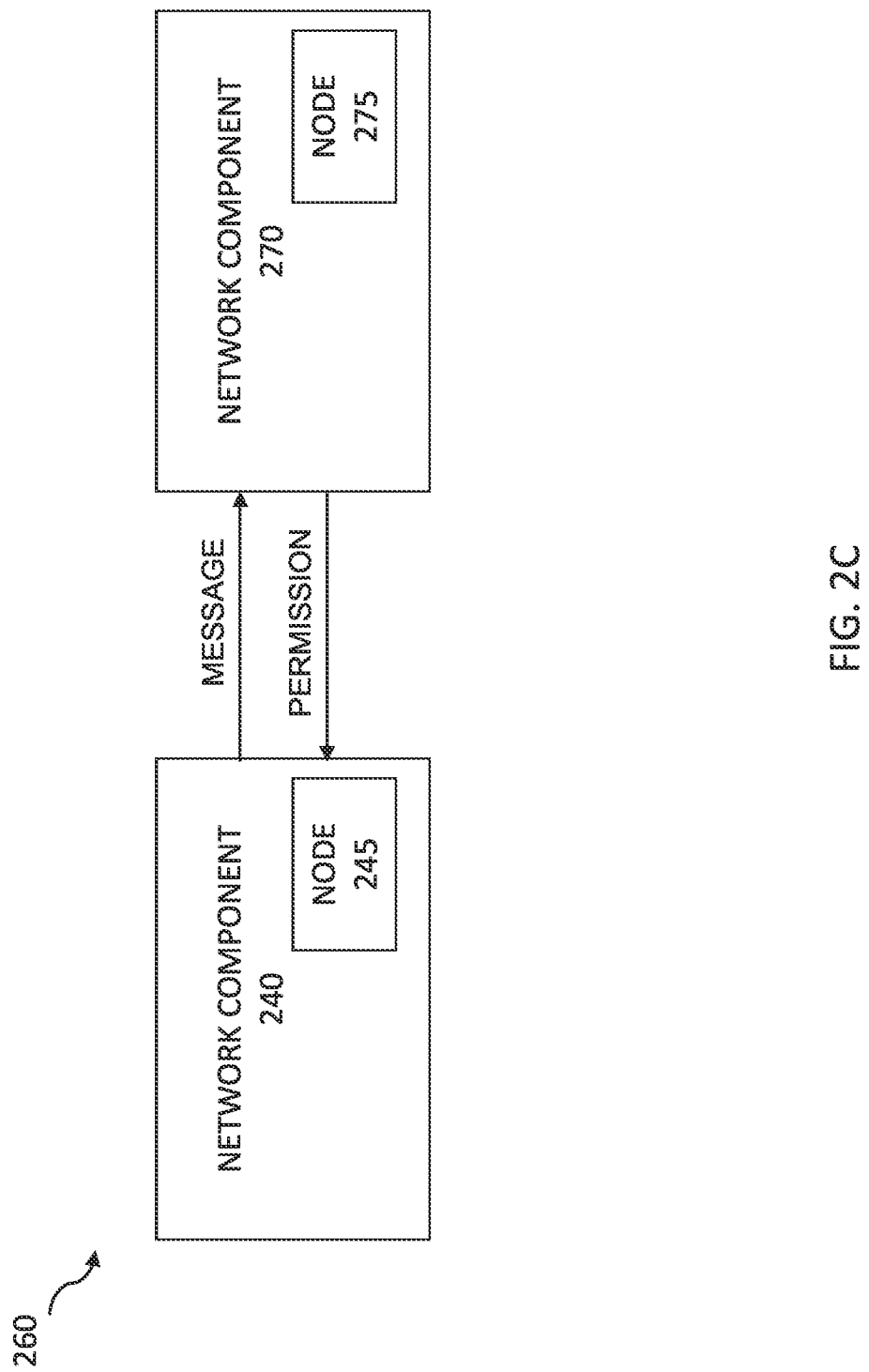
FIG. 2C is a block diagram illustrating communications between network components represented as nodes of a blockchain network.

Following the example, the mobile device, when communicating with other devices, can compare perform blockchain transactions to compare certificates of other devices in communication with the mobile device, whereas the gateway component can maintain a complete ledger of an entire network of blocks or transactions, and allow access to core network components when both requesting device and core network components are verified by the gateway component. FIGS. 2A-2C provide examples of such functionality for different devices, components, or systems.

FIG. 2A is a block diagram illustrating communications 200 between two separate devices represented as nodes of a blockchain network. For example, a device 210 can send a message to a device 220 over the network 110. The device can also send, via a node component 215 or similar agent associated with the device 210, a certificate or other identifier of the device. The device 220, via its node component or agent, can verify the device 210 based on the transmitted certificate.

For example, the device 220 can compare the credentials of the device 210 with one or more previous transactions performed by the device 210 on the network. When the credentials are associated with authenticated or acceptable transactions (or previous verifications), the device 220 verifies the device 210 to the network 110 (enabling the device 210 to utilize all or certain services provided by the network 210). Upon verification, the device 220 can transmit a verification message back to the device 210 (which can add the message to the blockchain via the node 215). Thus, in some embodiments, one device can verify and/or authenticate another device to the network 110 or other devices or systems associated with the network 110 by utilizing blockchain processes.

FIG. 2B is a block diagram illustrating communications 230 between a device and a network component, where both are represented as nodes of a blockchain network. For example, the device 210 can send a message to a network component 240 (e.g., a network component of architecture 120), such as when attempting to access the network 110 via one or more access points. The device 210, via its associated agent 250, transmits information to the network component 240, which compares the information, via its associated blockchain node 245, to records of the blockchain, in order to validate the device 210 to the network 110.

For example, such as process can occur every time the device 210 accesses the network 110, or in response to potential attempts to access the network 110 without permission or knowledge of the various network components 240. Once validated, the node 245 adds a transaction to the blockchain representing activity within the network 110, and the device 210 communicates over the network 110 as requested. Thus, in some embodiments, network components 240 can, at each or some of the components, perform validation processes for a device that attempts to access services provided by the network 210.

FIG. 2C is a block diagram illustrating communications 260 between network components represented as nodes of a blockchain network. At times, one network component 270 can perform various blockchain processes in order to permit another network component (e.g., component 240) to perform its intended functions for the network 110.

For example, the network component 240 can, via its agent 245, send a message to the network component 270 as part of a normal core network function or process. To avoid perpetuating messages from a compromised component, the network component 270 can, via its node 275, compare the message to the blockchain, and give permission for the network component 240 to continue to operate within the network 110. Thus, in some embodiments, the network components themselves can act as nodes of a blockchain in order to maintain the integrity and reliability of operation and processes of the telecommunications network 110.

Thus, in various embodiments, the telecommunications network 110 utilizes the functionality of a distributed ledger to provide various components, devices, or systems with the means to act as authentication, validation, or verification interfaces for the network 110. The following section illustrates details for specific embodiments employing such functionality.

FIG. 1 and the discussion herein provide a brief, general description of a suitable computing environment in which devices and network components function as nodes on a blockchain network can be supported and implemented. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or another scheme). Portions of the system can reside on a server computer, while corresponding portions can reside on a client computer such as a mobile or portable device, and thus, while certain hardware platforms are described herein, aspects of the system are equally applicable to nodes on a network. In an alternative embodiment, the mobile device or portable device can represent the server portion, while the server can represent the client portion.

In some embodiments, the devices can include network communication components that enable the devices to communicate with remote servers or other portable electronic devices by transmitting and receiving wireless signals using a licensed, semi-licensed, or unlicensed spectrum over communications networks. In some cases, the telecommunication network can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other 3GPP or non-3GPP communications networks.

Examples of Monitoring a Telecommunications Network Using Blockchain Nodes

As described herein, in some embodiments, the systems utilize network components within the network architecture 120 to monitor the operations of the telecommunications network 110 and identify network components that can be compromised, attacked, or otherwise performing sub-optimally.

Figure 3:
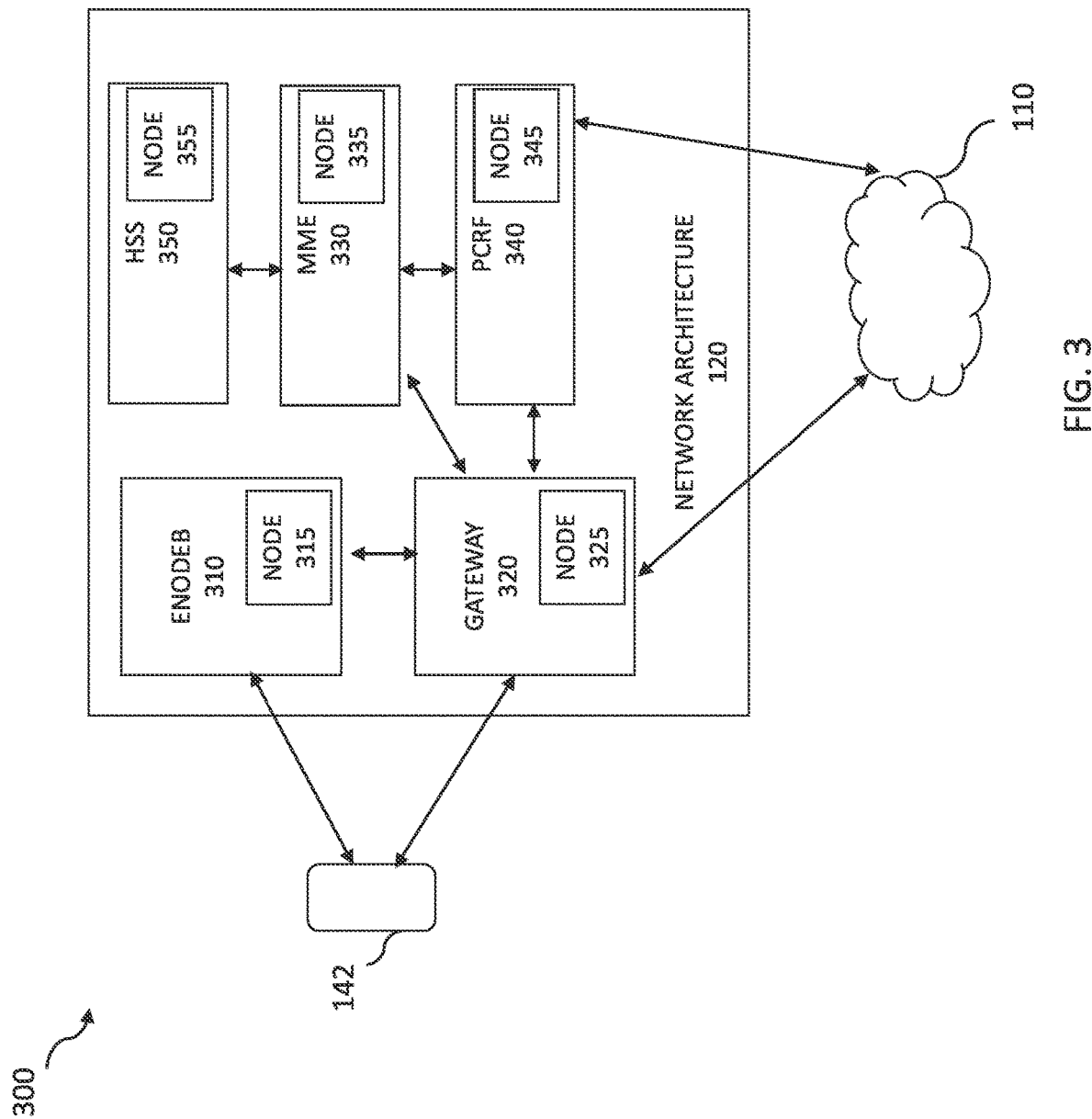
FIG. 3 is a block diagram illustrating a network architecture of components operating as distributed nodes of a blockchain network.

FIG. 3 is a block diagram illustrating a network 300 of components operating as distributed nodes of a blockchain network. The network architecture 120 provides the telecommunications network 110 to the mobile device 142 or other mobile devices (e.g., smart phones, tablets, laptops, IoT devices, and so on). The telecommunications network 110 can be a variety of different networks, including a wireless network, a Long-Term Evolution (LTE) network, an IP Multimedia System (IMS) network, or other networks described herein.

As depicted, some or all of the network components that establish and manage the network 110 (e.g., the network components of the network architecture 120) can be configured or provisioned to include a blockchain node, such as a node that includes a blockchain agent configured to perform blockchain transactions, operations, or other processes associated with a blockchain or ledger, which tracks and maintains a history of all transactions performed within the telecommunications network by the network components.

In some embodiments, the nodes are implemented as JavaScript modules (e.g., "Node.js"), or other similar modules (e.g., Solidity modules) and the ledger or blockchain is configured as JavaScript array. Thus, each network component can include a blockchain node. A network component, having a blockchain node, is capable of accessing a full copy of the blockchain representing the network 110, performing operations associated with the blockchain, and adding transaction data (e.g., blocks) to the blockchain associated with activities and actions performed by the network component or other components of the network 110.

Various different types of network components can include a blockchain node. For example, with respect to LTE networks, an Evolved Node B (eNodeB) 310 includes a blockchain node 315, a gateway component 320 includes a blockchain node 325, a Mobility Management Entity (MME) 330 includes a blockchain node 335, a charging component (e.g., the Policy and Charging Rules Function, or PCRF) 340 includes a blockchain node 345, and a Home Subscriber Service (HSS) 350 includes a blockchain node 355.

Of course, any network component, for any type of network, can be configured to include a blockchain node. For example, all manner of access network components (e.g., Evolved Universal Mobile Telecommunications System (UMTS) Terrestrial Radio Access, or E-UTRAN components, base stations, cell sites, access points and so on), can include a blockchain node. As another example, various gateway components 320 or Evolved Packet Core (EPC) components (e.g., a Serving gateway (SGW), Packet Data Network (PDN) gateway (PDN GW), the MME 330, and the HSS 350) can include a blockchain node. Further, charging components 340 (e.g., the PCRF, a Policy and Charging Enforcement Function (PCEF), and other charging systems can include a blockchain node. Additionally, other network components (e.g., components that handle emergency functions, billing, and so on), can include blockchain nodes.

Thus, some or all network components of the network architecture 120 can include a blockchain node, and can act as distributed nodes for managing a blockchain that represents the telecommunications network 110 and transactions performed within the network 110.

Figure 4:
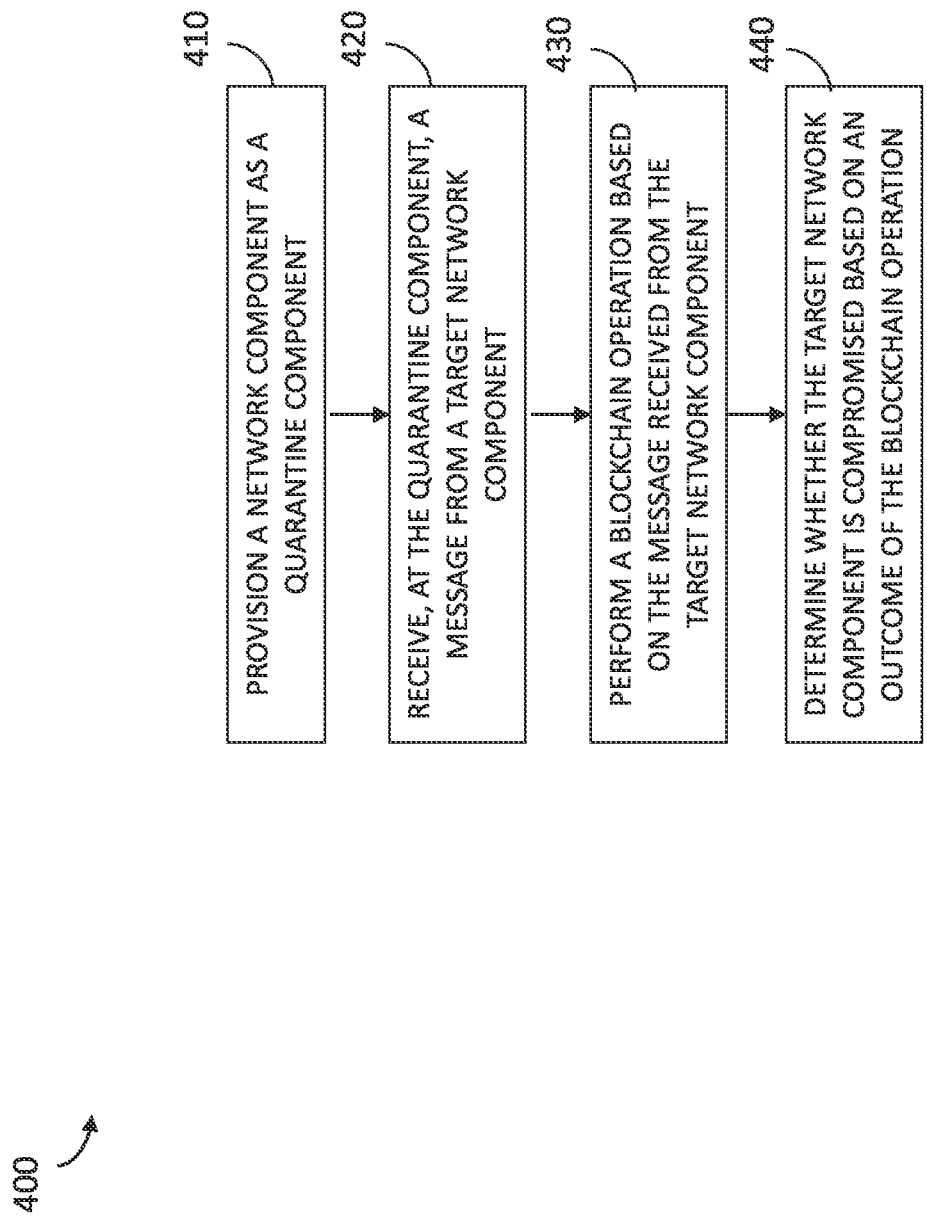
FIG. 4 is a flow diagram illustrating a method of identifying compromised network components within a telecommunications network.

The nodes 315, 325, 335, 345, and/or 355, therefore, can perform various processes on behalf of the network 110, in order to prevent attacks to the network and/or identify potentially compromised or poorly performing components. FIG. 4 is a flow diagram illustrating a method 400 of identifying compromised network components within a telecommunications network. The method 400 can be performed by a blockchain node of a network component (e.g., nodes 315, 325, 335, 345, and/or 355), and, accordingly, is described herein merely by way of reference thereto. It will be appreciated that the method 400 can be performed on any suitable hardware or network component.

In operation 410, the blockchain node of the network component provisions the network component as a quarantine component. For example, the blockchain node determines, via the blockchain, that a certain network component is known to be uncompromised and operating as predicted within the telecommunications network. As described herein, the blockchain node may, via one or more blockchain operations, confirm the network component is operating properly within the network and/or provide various credentials confirming (or re-confirming), that the network component is under control of the network 110 and operating as intended.

In operation 420, the blockchain node of the network component receives a message from a target network component, where the target network component is potentially compromised by a cybersecurity attack to the telecommunications network. For example, the blockchain node can receive a message or other communication as part of normal operations between network components (e.g. the MME can send a controlling signal to an SGW (e.g., gateway 320) to serve the mobile device 142 (or another user equipment).

In operation 430, the blockchain node of the network component performs a blockchain operation with a blockchain that tracks activities within the telecommunications network 110. For example, the blockchain node performs an operation, based on the message received from the target network component, to compare identity information, credentials, or other contents of the message with previous messages transmitted by the target network component and managed as transactions (or blocks) on the blockchain.

In operation 440, the blockchain node of the network component determines whether the target network component has been compromised by the cybersecurity attack to the telecommunications network 110 based on the performed blockchain operation. For example, the blockchain node can determine that the target network component has been compromised when information within the message does not match information contained by transactions of the blockchain that are associated with the target network component.

However, in other cases, the blockchain operation can determine that the information within the message can indicate the network component has not been compromised (e.g., a comparison with the blockchain indicates a positive match of identifiers, credentials, operation parameters or configuration values, and so on).

Once the blockchain node determines the validity or integrity of the network component, the node can perform various actions according to the determination. For example, the node can perform a corrective action (e.g., a self-organizing network (SON) operation) within the telecommunications network 110 to replace the target network component within the telecommunications network 110 (e.g., with a new or uncompromised network component).

As another example, the node can perform a corrective action (e.g., a SON action or operation) within the telecommunications network 110 to modify one or more parameters of the target network component and mitigate the cybersecurity attack to the telecommunications network (e.g., place the component on a black list and route network traffic away from the network component, effectively quarantining the network component).

Further, the blockchain node can also perform a blockchain transaction based on the determination of the integrity of the network component. For example, the node can perform a transaction to the blockchain that includes a hash of a previous block in the blockchain, a timestamp for the transaction, and transaction data that identifies whether the target network component was determined to be compromised.

Thus, in some embodiments, the systems configure network components as quarantine components, which seek out and attempt to identify compromised or poor performing network components before harm is done to the network 110 or its performance.

The network 110, therefore, can self-regulate or protect itself by: receiving a message at a first network component from a second network component, where the second network component is potentially compromised by an attack on the telecommunications network, performing, via a node of the first network component, a blockchain operation with a blockchain that tracks activities within the telecommunications network, and determining whether the second network component has been compromised by the attack to the telecommunications network based on the performed blockchain operation.

As described herein, the telecommunications network 110 can represent a distributed network of nodes managing a blockchain or ledger of transactions for the network 110 in order to effect real-time monitoring of the network 110 for attacks or sub-optimal performances of components. FIG. 5 is a flow diagram illustrating a method 500 for monitoring, in real-time, a telecommunications network using components of the network. The method 500 can be performed by a blockchain node of a network component (e.g., nodes 315, 325, 335, 345, and/or 355), and, accordingly, is described herein merely by way of reference thereto. It will be appreciated that the method 500 can be performed on any suitable hardware or network component.

In operation 510, the nodes of the network components monitor, in real-time, activities of other network components within the telecommunications network using the blockchain that tracks the activities of the telecommunications network. For example, the nodes can access messages, signals, information exchanges, information requests, provisioning requests, updates, database operations, charging requests, billing records, subscriber databases, and so on, for atypical or unknown information, parameters, actions, or other anomalies.

In operation 520, the nodes of the network components identify, during the real-time monitoring of the network components, atypical activities associated with one or more network components. For example, the nodes can perform some or all of the blockchain operations described herein (e.g., comparisons of identity information) when identifying activities that are atypical or associated with compromised or poor performing network components.

In operation 530, the nodes of the network components determine, based on the identified atypical activities, that one or more network components are potentially compromised, and flag the component for corrective or preventative actions. For example, the nodes can perform a blockchain transaction that identifies the network components as being compromised or performing below certain quality of service (QoS) standards, and flag the network components.

In operation 540, the network can perform an action to modify the operation of the flagged network components. For example, the network can identify the network components to running SON processes, which can optimize or heal the network components, or bring the network components offline to avoid contamination of other network components with the network 110.

Thus, as described herein, the telecommunications network 110, operating as a set of distributed nodes, performs various actions to determine whether network components are compromised, operating properly or with integrity, operating optimally, and so on. Some examples of the actions enabled by representing the network architecture 120 as a blockchain network include:

Determining, by an eNodeB component (and associated blockchain node), that a mobile device attempting to access the network 110 is impersonating another mobile device in order to gain access;

Determining, by a gateway component, that an eNodeB component is a spoof or rogue base station, and is attempting to compromise the network 110;

Determining, by a PCRF component, that subscriber charges for use of the network 110 are fraudulent and inconsistent with actual use of the network 110;

Determining, during handover operations between cell sites, that messages or voice calls are being intercepted and pushed to fake or malicious networks or cell sites; and so on.

Thus, in some embodiments, the systems provide blockchain nodes to network components of the network architecture 120 in order to protect the telecommunications network 110 from attacks, optimize performance of the network, and other benefits.

For example, the systems utilize the blockchain nodes to ensure software updates are legitimate and not associated with malicious software or malware. For example, an update to an HSS component that includes malware may be mitigated by the systems, because a node associated with HSS will first attempt to attest to the component providing the update. Thus, without the node attesting or verifying the software update, the network prevents the update from accessing the HSS, and a potential attack is avoided.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include not only additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

Certain aspects of the technology are presented below in certain claim forms to reduce the number of claims, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system for identifying compromised network components within a telecommunications network, the system comprising:
   a gateway node of the telecommunications network containing a first blockchain node associated with a blockchain that maintains transactions for the telecommunications network;
   a cell site containing a second blockchain node associated with the blockchain that maintains transactions for the telecommunications network, wherein the cell site is configured to provide access to the telecommunications network; and
   a charging node of the telecommunications network containing a third blockchain node associated with the blockchain that maintains transactions for the telecommunications network, wherein the charging node is configured to regulate and enforce charging decisions for the telecommunications network,
   wherein at least one of the blockchain nodes is configured to:
      monitor, in real-time, activities of network components within the telecommunications network using the blockchain that tracks the activities of the telecommunications network;
      identify, during the real-time monitoring of the network components, atypical activities associated with one or more of the network components; and
      determine, based on the identified atypical activities, that the one or more network components are compromised by a cybersecurity attack to the telecommunications network.

2. The system of claim 1, wherein at least one of the blockchain nodes is configured to:
   perform operations comparing activities performed by network components of the telecommunications network to information contained within transactions of the blockchain; and
   identify compromised network components based on the performed operations.

3. The system of claim 1, wherein at least one of the blockchain nodes is configured to:
   perform operations comparing activities performed by network components of the telecommunications network to information contained within transactions of the blockchain; and
   identify network components operating at sub-standard performance levels based on the performed operations.

4. The system of claim 1, wherein at least one of the blockchain nodes is configured to:
   performing a corrective action to mitigate the cybersecurity attack to the telecommunications network.

5. The system of claim 1, wherein the transactions comprise information identifying a location of a user or device, one or more device identifiers, one or more user identifiers, biometric information, other biological user identifiers, or physical user identifiers.

6. The system of claim 1, wherein at least one of the blockchain nodes is configured to:
   track and maintain a history of all transactions performed within the telecommunications network by the network components.

7. The system of claim 1, wherein at least one of the blockchain nodes includes a Javascript script that acts as a blockchain agent.

8. A method performed by a telecommunications network, the method comprising:
   provisioning one or more network components each containing a blockchain node associated with a blockchain that tracks transactions of the telecommunications network,
   wherein a gateway component node of the telecommunications network contains a first blockchain node associated with the blockchain,
   wherein a cell site contains a second blockchain node associated with the blockchain,
   wherein the cell site is configured to provide access to the telecommunications network,
   wherein a charging component node of the telecommunications network contains a third blockchain node associated with the blockchain, and
   wherein the charging node is configured to regulate and enforce charging decisions for the telecommunications network;

monitoring, in real-time, activities of the one or more network components within the telecommunications network using the blockchain that tracks the activities of the telecommunications network;

identifying, during the real-time monitoring of the one or more network components, a transaction comprising information of atypical activities associated with at least one of the network components;

determining, based on the identified atypical activities, that the at least one network component is compromised by an attack to the telecommunications network; and upon determining that the at least one network component has been compromised by the attack to the telecommunications network, performing an action to modify operation of the at least one network component.

9. The method of claim 8, wherein the action comprises modifying one or more parameters of the at least one network component that is compromised by the attack to the telecommunications network.

10. The method of claim 8, wherein the action comprises replacing the at least one network component that is compromised by the attack to the telecommunications network.

11. The method of claim 8, wherein determining whether the at least one network component has been compromised by the attack to the telecommunications network comprises comparing information within a message received from the at least one network component with information contained by transactions of the blockchain that are associated with the at least one network component.

12. A non-transitory computer-readable medium whose contents, when executed by a network component of a telecommunications network, cause the network component to perform a method, the method comprising:

provisioning one or more network components each containing a blockchain node associated with a blockchain that tracks transactions of the telecommunications network, wherein a gateway component node of the telecommunications network contains a first blockchain node associated with the blockchain, wherein a cell site contains a second blockchain node associated with the blockchain, wherein the cell site is configured to provide access to the telecommunications network, wherein a charging component node of the telecommunications network contains a third blockchain node associated with the blockchain, and wherein the charging node is configured to regulate and enforce charging decisions for the telecommunications network;

monitoring, in real-time, activities of the one or more network components within the telecommunications network using the blockchain that tracks the activities of the telecommunications network;

identifying, during the real-time monitoring of the one or more network components, a transaction comprising information of atypical activities associated with at least one of the network components;

determining, based on the identified atypical activities, that the at least one network component is compromised by an attack to the telecommunications network; and upon determining that the at least one network component has been compromised by the attack to the telecommunications network, performing an action to modify operation of the at least one network component.

13. The non-transitory computer-readable medium of claim 12, wherein the action comprises modifying one or more parameters of the at least one network component that is compromised by the attack to the telecommunications network.

14. The non-transitory computer-readable medium of claim 12, wherein determining whether the at least one network component has been compromised by the attack to the telecommunications network comprises comparing information within a message received from the at least one network component with information contained by transactions of the blockchain that are associated with the at least one network component.

15. The method of claim 8, wherein identifying the transaction comprising information of atypical activities comprises comparing activities performed by the at least one of the network components of the telecommunications network to information contained within the transaction.

16. The method of claim 8, wherein the transactions comprise information identifying a location of a user or device, one or more device identifiers, one or more user identifiers, biometric information, other biological user identifiers, or physical user identifiers.

17. The method of claim 8, wherein provisioning the one or more network components comprises determining the one or more network components are uncompromised and operating as predicted within the telecommunications network, and providing the one or more network components with a ledger that tracks and maintains a history of all transactions performed within the telecommunications network by the one or more network components.

18. The non-transitory computer-readable medium of claim 12, wherein identifying the transaction comprising information of atypical activities comprises comparing activities performed by the at least one of the network components of the telecommunications network to information contained within the transaction.

19. The non-transitory computer-readable medium of claim 12, wherein the transactions comprise information identifying a location of a user or device, one or more device identifiers, one or more user identifiers, biometric information, other biological user identifiers, or physical user identifiers.

20. The non-transitory computer-readable medium of claim 12, wherein provisioning the one or more network components comprises determining the one or more network components are uncompromised and operating as predicted within the telecommunications network, and providing the one or more network components with a ledger that tracks and maintains a history of all transactions performed within the telecommunications network by the one or more network components.

* * * * *